(12) United States Patent
Bradley et al.

(10) Patent No.: US 8,261,926 B2
(45) Date of Patent: Sep. 11, 2012

(54) KIT FOR TEMPORALLY PROTECTING ELECTRICAL BOX

(76) Inventors: Frank H. Bradley, Hot Springs, AR (US); Wade R. Bradley, Hot Springs, AR (US)

( * ) Notice: Subject to any disclaimer, the term of this patent is extended or adjusted under 35 U.S.C. 154(b) by 1495 days.

(21) Appl. No.: 10/437,122

(22) Filed: May 13, 2003

(65) Prior Publication Data
US 2003/0213801 A1 Nov. 20, 2003

Related U.S. Application Data

(60) Provisional application No. 60/380,712, filed on May 14, 2002.

(51) Int. Cl.
*H02G 3/14* (2006.01)
(52) U.S. Cl. .......................................... 220/241; 220/3.8
(58) Field of Classification Search .................. 220/241, 220/3.8; 24/457, 455; 411/508–510, 913; 174/66, 67; 200/296; 206/223; 16/DIG. 2; 33/DIG. 10; D13/177
See application file for complete search history.

(56) References Cited

U.S. PATENT DOCUMENTS

| | | | |
|---|---|---|---|
| 1,550,870 A | | 8/1925 | Braden |
| 1,935,565 A | | 11/1933 | Goetzelman |
| 2,573,260 A | * | 10/1951 | Gorman .......................... 220/3.4 |
| 2,782,954 A | * | 2/1957 | Antonuci ...................... 220/3.92 |
| 2,788,151 A | * | 4/1957 | Shore ............................. 220/3.4 |
| 2,791,345 A | * | 5/1957 | Troutman ....................... 220/3.4 |
| 2,895,634 A | | 7/1959 | Comroe |
| 3,601,276 A | | 8/1971 | Culpepper |
| 3,609,647 A | * | 9/1971 | Castellano .................... 439/535 |
| 3,619,477 A | * | 11/1971 | Rasmussen ..................... 174/56 |

(Continued)

FOREIGN PATENT DOCUMENTS
EP    1 447 895 A1 *  8/2004

OTHER PUBLICATIONS

Drawings, Ratchet Fastener, Micro Plastics, Inc., Flippin, Arkansas, Nov. 13, 2001, 2 pages.

(Continued)

*Primary Examiner* — Robin Hylton
(74) *Attorney, Agent, or Firm* — Ray F. Cox, Jr.

(57) ABSTRACT

A kit for temporarily protecting an electrical outlet box and its contents during construction. The kit includes retaining clips and a cover plate of the appropriate dimensions to cover a single or multiple electrical outlet box. The cover plate is constructed of a material that is not easily damaged by a rotary cutting tool and preferably can be located magnetically. The outer dimensions of the cover plate are selected to cover the face of the electrical box, the screw sockets and the contents of the electrical box. Two screw openings aligned on the center line of the cover plate are positioned to align with the screw sockets in the electrical box. The retaining clips are snap-wise removably attached to the screw openings of the cover plate and may be used to secure the cover plate temporarily to the electrical box by a friction fit into the screw sockets of the electrical box that allows the cover plate to be removed simply by pulling on the cover plate. A removal opening locate asymmetrically in the cover plate allows the insertion of a tool such as a screwdriver or awl to remove the cover plate. The retaining clip is snap-wise removable from the cover plate so that the cover plate may secured to the electrical box by screws if desired.

4 Claims, 8 Drawing Sheets

U.S. PATENT DOCUMENTS

| | | | | |
|---|---|---|---|---|
| 3,840,692 | A | * | 10/1974 | Wells .............................. 174/66 |
| 3,860,999 | A | * | 1/1975 | Meyer ............................ 411/510 |
| 4,032,030 | A | * | 6/1977 | Bass et al. ....................... 220/3.8 |
| 4,059,905 | A | * | 11/1977 | Wieting ........................... 33/528 |
| 4,359,619 | A | * | 11/1982 | Bergoltz ......................... 200/333 |
| 4,479,317 | A | * | 10/1984 | Hanna ......................... 40/299.01 |
| 4,534,486 | A | * | 8/1985 | Eidson ........................... 220/241 |
| 4,818,822 | A | * | 4/1989 | Yahraus .......................... 174/53 |
| 4,907,711 | A | | 3/1990 | Stuchlik, III |
| 5,072,848 | A | * | 12/1991 | Pipis et al. .................... 220/241 |
| 5,301,437 | A | | 4/1994 | Burke |
| 5,359,152 | A | * | 10/1994 | Hone-Lin ....................... 174/53 |
| 5,373,611 | A | * | 12/1994 | Murata ............................ 24/297 |
| 5,393,185 | A | * | 2/1995 | Duffy, Jr. ....................... 411/510 |
| 5,562,222 | A | * | 10/1996 | Jordan et al. .................. 220/3.8 |
| 5,623,124 | A | * | 4/1997 | Chien ............................ 174/53 |
| 5,639,991 | A | | 6/1997 | Schuette |
| 5,695,307 | A | * | 12/1997 | Takahashi .................... 411/508 |
| 5,741,102 | A | * | 4/1998 | Everett et al. ................. 411/339 |
| 5,902,960 | A | * | 5/1999 | Smith ............................ 174/66 |
| 6,501,022 | B2 | * | 12/2002 | Victor ............................ 174/66 |
| 6,686,540 | B2 | * | 2/2004 | Compagnone, Jr. ........... 174/58 |
| 6,703,562 | B1 | * | 3/2004 | Pacheco ......................... 174/66 |
| 6,752,576 | B2 | * | 6/2004 | Johansson et al. ............. 411/21 |
| 7,075,008 | B2 | | 7/2006 | Smith |

OTHER PUBLICATIONS

Website, www.microplastics.com, Spin Clips, Micro Plastics, Inc., Flippin, Arkansas, date of publication unknown, printed from website Apr. 28, 2003, 4 pages.

* cited by examiner

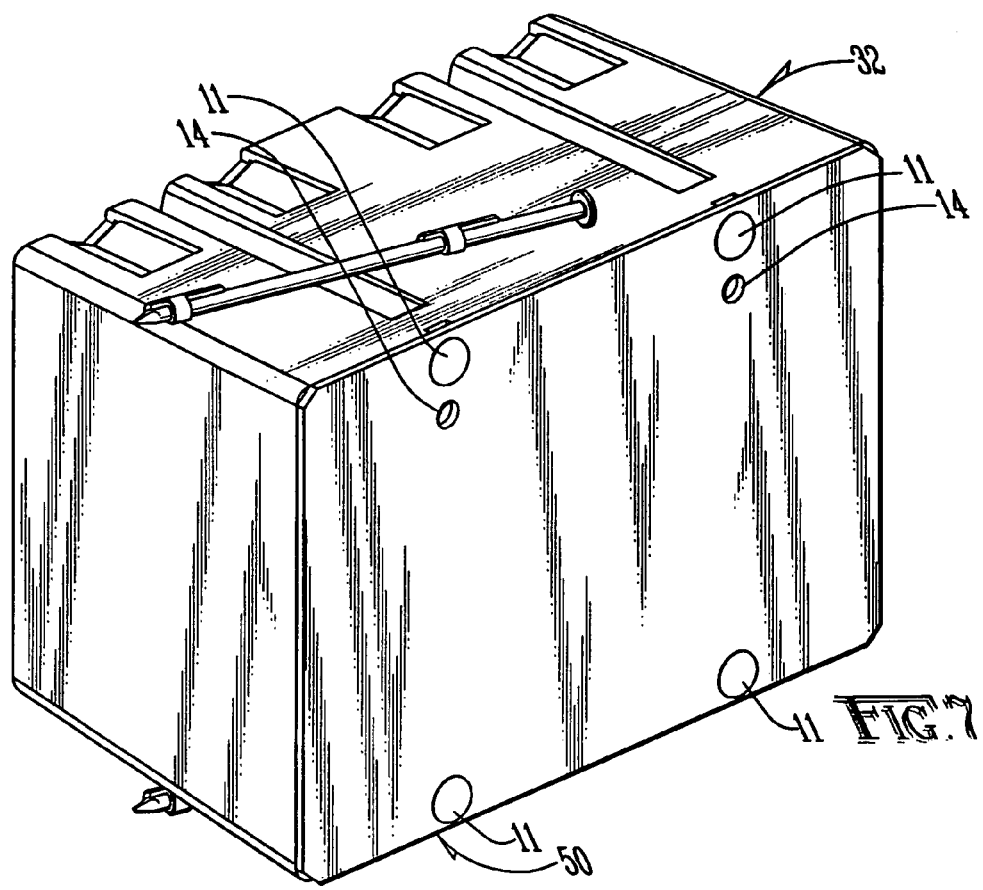
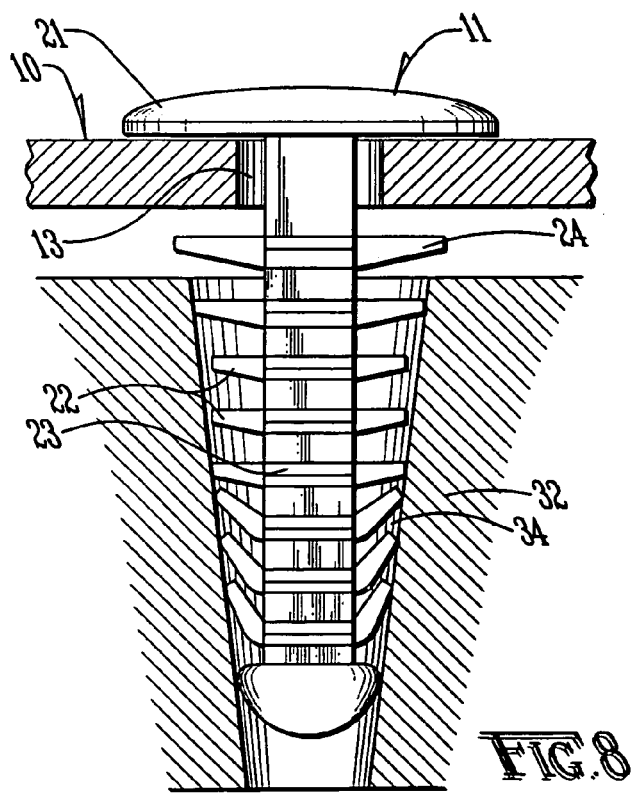

KIT FOR TEMPORALLY PROTECTING ELECTRICAL BOX

CROSS-REFERENCE TO RELATED APPLICATIONS

This application claims the benefit of U.S. Provisional Application No. 60/380,712 filed May 14, 2002, the disclosure of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates to a temporary cover plate for protecting an electrical outlet box or the like and its contents during construction activities.

2. Brief Description of the Related Art

During the construction of commercial or residential buildings, electrical outlet boxes and their contents suffer many abuses from the other subcontractors that work on the same job site. As used herein, the terms "electrical outlet box" and "electrical box" refer to any of the various types of boxes used in residential, commercial or industrial construction that are used to contain electrical wires or electrical fixtures such as switches, outlets, light dimmers, telephone and audio-visual connections, smoke and fire detectors, security devices, lighting and the like. The terms "electrical box" or "electrical outlet box" are also intended to refer to mud rings.

During the initial phase of wiring a building, the electrician will install numerous electrical outlet boxes. After all the electrical outlet boxes are installed, the electrician will then rough-in the wiring by pulling wires from a central location in the building to the appropriate electrical outlet box. When the wires are pulled to the appropriate electrical outlet box, the electrician will leave enough wire to attach the device that will be permanently mounted in that electrical outlet box during the next phase of the construction project. Once the wire conductors are pre-trimmed and stripped, the electrician will roll or fold the wire conductors in some manner, and push them into the electrical outlet box. At this point the electrical box and it contents are not protected from damage or disturbance. The electrical outlet box and its contents are exposed to potential damage from other subcontractors, such as insulation installers, sheet rock installers, floaters, painters, and specialty covering applicators.

Insulation installers have a tendency to blow cellulose or other type of insulation into the electrical outlet box during the process of filling the wall cavities with insulation that in turn fills the electrical outlet box with insulation. When a motorized raker is used to trim the excess insulation flush with the wall studs there is potential damage to the electrical outlet box and its contents. The electrician will have to spend time and material to repair any damage done to the electrical outlet box and to remove the insulation that was deposited into the electrical outlet box.

When the drywall installers, start their phase of the construction project is when the most potential damage to the electrical outlet box and its contents can occur. The drywall is affixed to the wall studs with nails or screws or both and is placed directly over the electrical outlet box. Once the drywall is affixed permanently to the wall studs, the drywall installer will cut openings in the drywall to expose the electrical outlet box. The openings are typically cut with some form of rotary cutter. This tool has a high-speed rotary bit similar to a common drill bit, but is designed to cut along the shank of the cutter. The typical method for the drywall installer is to find the electrical outlet box location from the bulge in the wall or a mark on the wall that the drywall installer made and then insert the high-speed cutter through the drywall and cut an opening around the electrical outlet box. The intent is to cut an opening around the electrical outlet box as close to the outside as possible using the outside of the electrical outlet box as a guide. However, as the sheet rock installer inserts the high speed rotary cutter through the sheet rock, sometimes the high speed rotary cutter is inadvertently put inside the electrical outlet box which severs or damages the wire conductors in the electrical outlet box. If the drywall installer fails to cut the opening to the outside of the electrical outlet box, the electrical outlet box will not be flush to the surface of the exterior of the drywall, which will force the electrical outlet box deeper into the wall cavity. If the electrical outlet box is left in this condition, the device that will be permanently mounted into the electrical outlet box will not fit properly and the electrician will not be able to install the device. There is also a safety concern when the wire conductors in the electrical outlet box are damaged. If the wire conductors are nicked in some manner and are not discovered by the electrician there is the possibility of a short circuit. Also there may be electrical code violations if the wire conductors are cut to a point that reduces the current carrying capabilities of the conductors, and/or the length of the conductors are not left long enough in the electrical outlet box to meet code. Any damage to the electrical outlet or the wire conductors will have to be repaired by the electrician causing unnecessary wasted time and extra material.

An additional problem occurs when the drywall installer fails to find all of the electrical outlet boxes of the construction project. Floaters use joint compound and some form of paper tape or fiber tape to finish the seams and joints in the drywall to produce a smooth surface on the wall. During this process the electrical outlet box and its contents will be exposed to the joint compound used by the floaters. The electrical outlet box and the screw sockets of the electrical outlet box may be filled with the joint compound, which dries to a rigid non-pliable form and is very difficult to remove. The electrician then has to remove the excess joint compound and prepare the electrical outlet box to receive the devices that will be permanently installed in the electrical outlet box.

During the specialty covering or texturing of the walls or ceiling, a diluted form of the joint compound or other mixture is sprayed, rolled or applied in some manner to give the surface the desired textured finish. During this phase of the construction project the electrical outlet box and its contents are exposed once again to this joint compound mixture that accumulates in the electrical outlet box and in the screw sockets of the electrical outlet box. The electrician will have to remove this accumulated mixture in order to install the required device in the electrical outlet box.

During the painting phase of the construction project, the wire conductors and the screw sockets of the electrical outlet box may be covered with paint. The electrician will spend unnecessary extra time preparing each electrical outlet box that has been coated with paint.

During all phases of the construction project, many of the subcontractors need power for their tools and lights. It is a common practice for a subcontractor to temporarily attach an outlet to the electrical outlet box rough-in wiring and then remove the temporary outlet when their phase of construction is completed. The constant manipulation of the rough-in wiring by attaching and removing temporary devices causes the wire conductors in the electrical outlet box to become kinked and twisted. This again forces the electrician to spend time in repairing the conductors.

The limitations of the prior art are overcome by the present invention as described below.

BRIEF SUMMARY OF THE INVENTION

The present invention is a temporary cover plate for protecting an electrical box and its contents during construction. The device is a blank cover of the appropriate dimensions to cover a single or multiple gang electrical box. Covers for a single gang box may be overlapped to cover multiple gang boxes or a larger cover of the appropriate size may be used to cover multiple gang boxes. The cover is constructed of a material that is not easily damaged by a rotary cutting tool. Preferably, the material is steel to allow for the cover to be located magnetically after the box is hidden under drywall. The outer dimensions are selected to cover the face of the outlet box, the screw sockets and the contents of the box. The covers should be substantially the same dimensions as the opening of the electrical box so that the contents are protected by the cover but a rotary cutting tool can cut closely around the outer periphery of the box. Two holes aligned on the center line of the cover are positioned to align with the screw sockets in the outlet box to allow retaining clips to secure the cover temporarily to the box. The retaining clips are friction fit fasteners that allow the cover plate to be removed simply by pulling on the cover plate. The term "friction fit" as used herein refers to a manner in which fasteners may be used with either tapered screw sockets where the screw is intended to be self-tapping or with threaded screw holes. An additional opening in the cover, such as a circular hole or a slot, allows the insertion of a finger or tool such as a screwdriver to remove the cover. The removal opening is preferably small enough to minimize the possible of a tool such as a rotary tool from being accidentally inserted through the opening. The removal opening is also desirably located toward one of the screw openings since an asymmetrical position allows leverage to be applied to first one and then the other clip for easier removal of the cover plate from the electrical box. The retaining clip must be long enough to engage tapered screw sockets that are common in modern plastic electrical boxes where the screw is self-tapping. The clip may be shortened to allow easier removal when used with electrical boxes that have threaded screw holes, such as mud rings. The clip may be snap-wise fastened to the cover. This snap action may be achieved by having at least one external rib nearest to the head of the clip larger than the other ribs which pass more easily through the screw opening. The clip may be retained on the cover plate even after the cover plate and clip are removed from the electrical box. This provides the flexibility to treat the cover plate and clip as a unit or to remove the clip when it is desirable to secure the cover plate to the electrical box with screws instead of the retaining clip.

These and other features, objects and advantages of the present invention will become better understood from a consideration of the following detailed description of the preferred embodiments and appended claims in conjunction with the drawings as described following.

BRIEF DESCRIPTION OF THE SEVERAL VIEWS OF THE DRAWINGS

FIG. 7 is a perspective view of a double gang electrical box covered by a double cover plate.

FIG. 8 is a front elevation view of a retaining clip being used to attach a cover plate (shown in partial cross-section) to an electrical box having a tapered screw socket.

DETAILED DESCRIPTION OF THE INVENTION

With reference to FIGS. 1-8, the preferred embodiment of the present invention may be described as follows.

Figure 1:
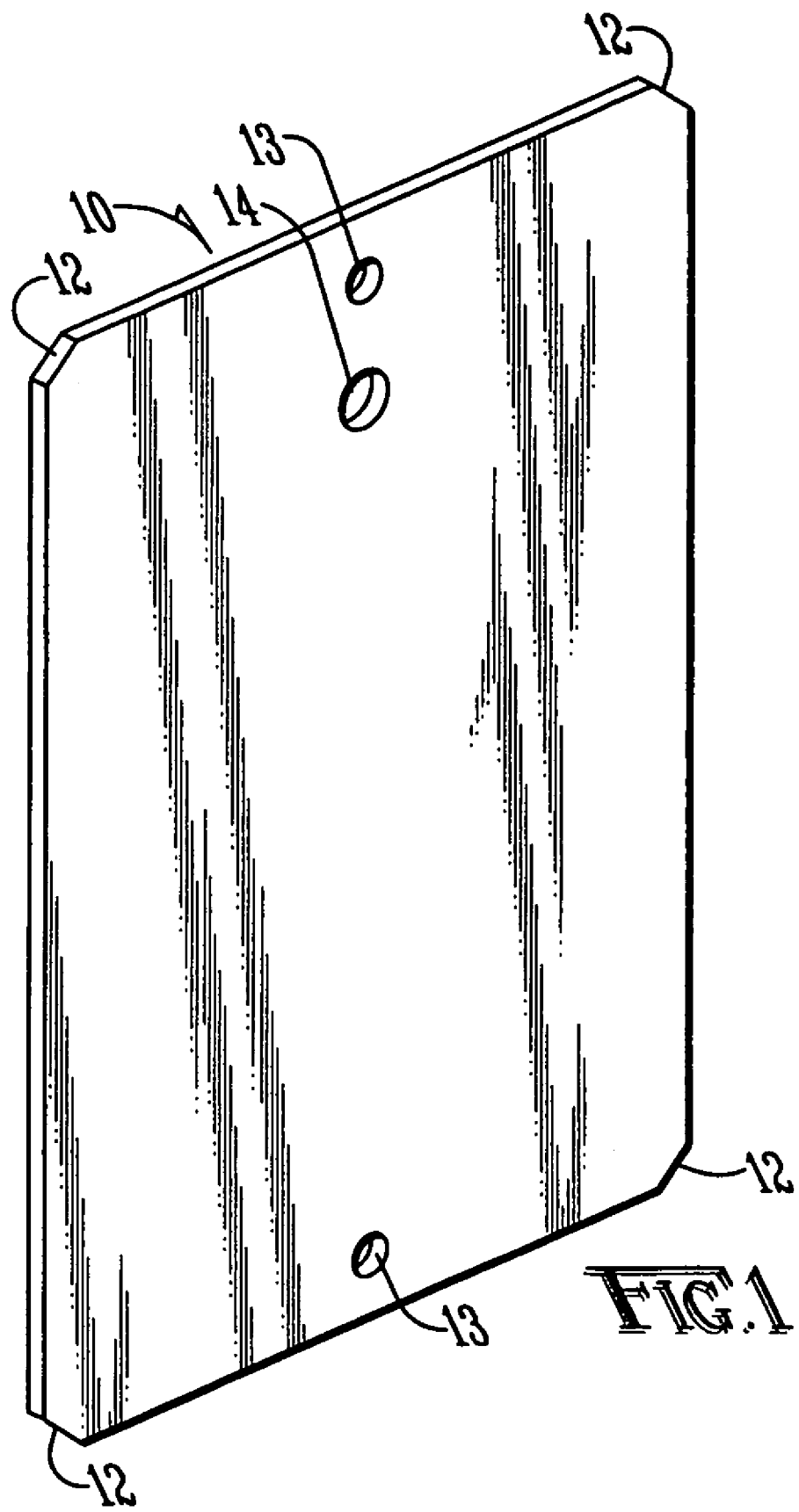
FIG. 1 is a perspective view of a cover plate of the present invention.
Figure 3A:
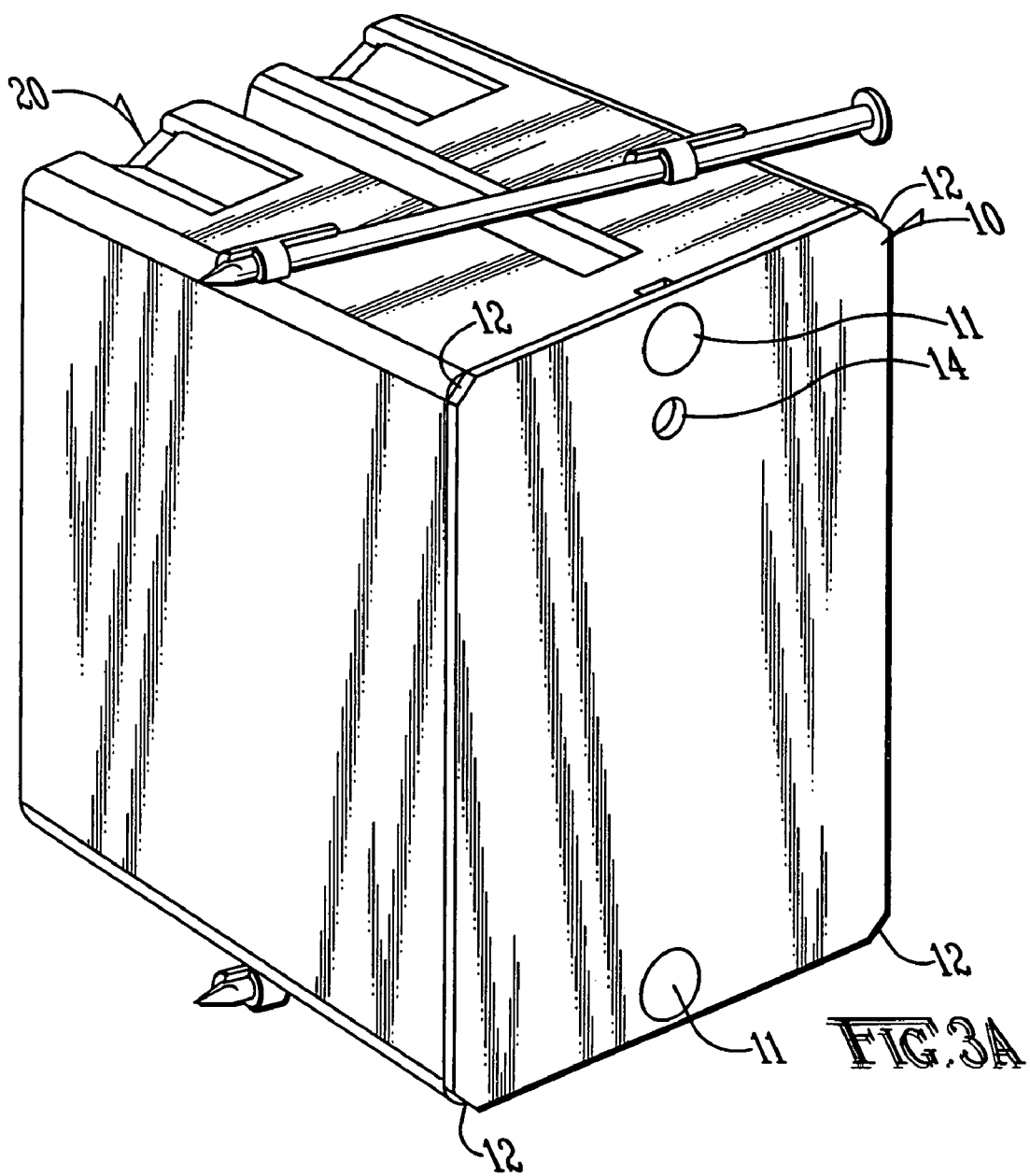
FIGS. 3A and 3B are perspective views of a single gang electrical box with a cover plate attached over the front opening by retaining clips. A round removal opening is shown in FIG. 3A and a slotted removal opening is shown in FIG. 3B.
Figure 3B:
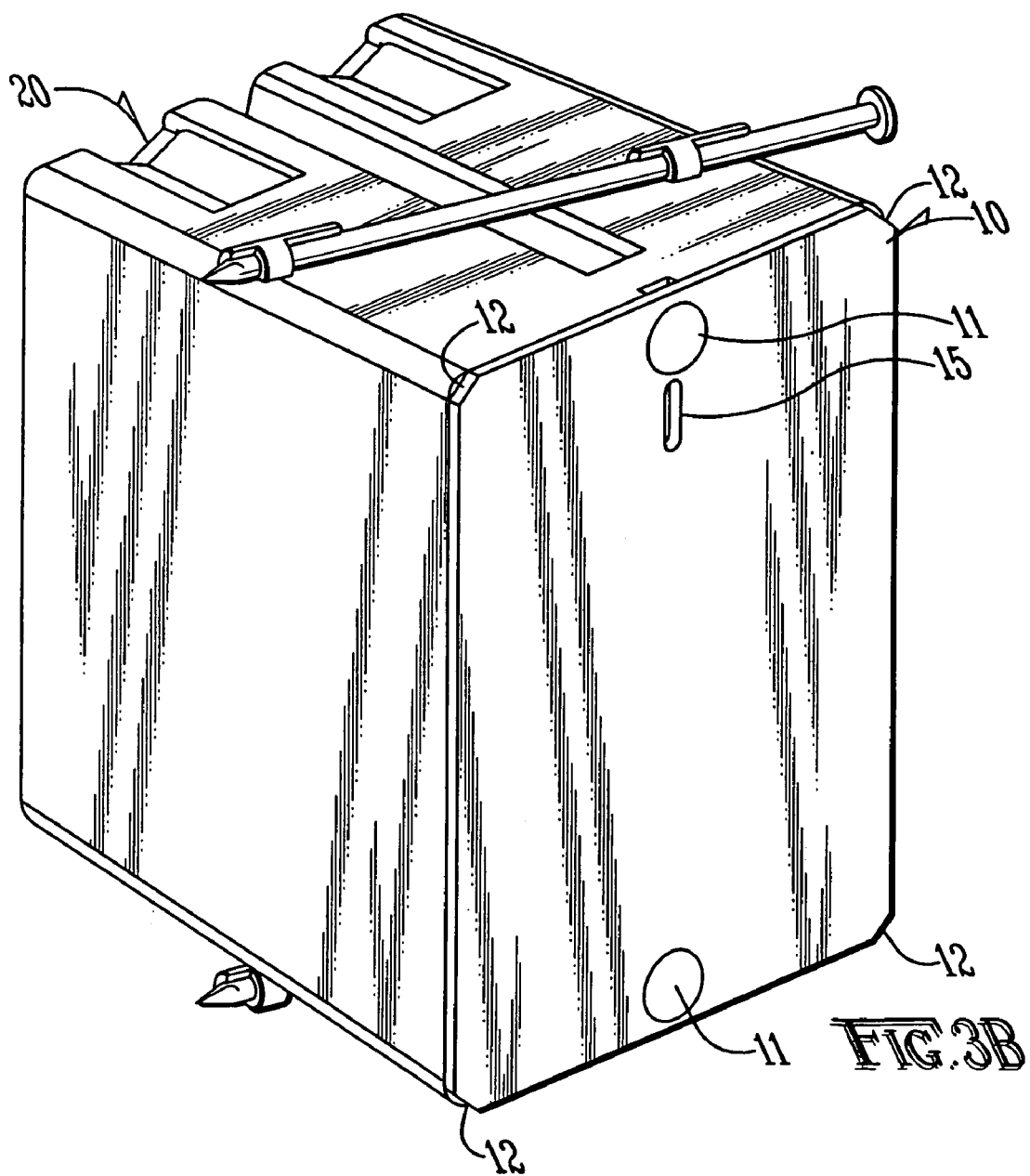
Figure 4:
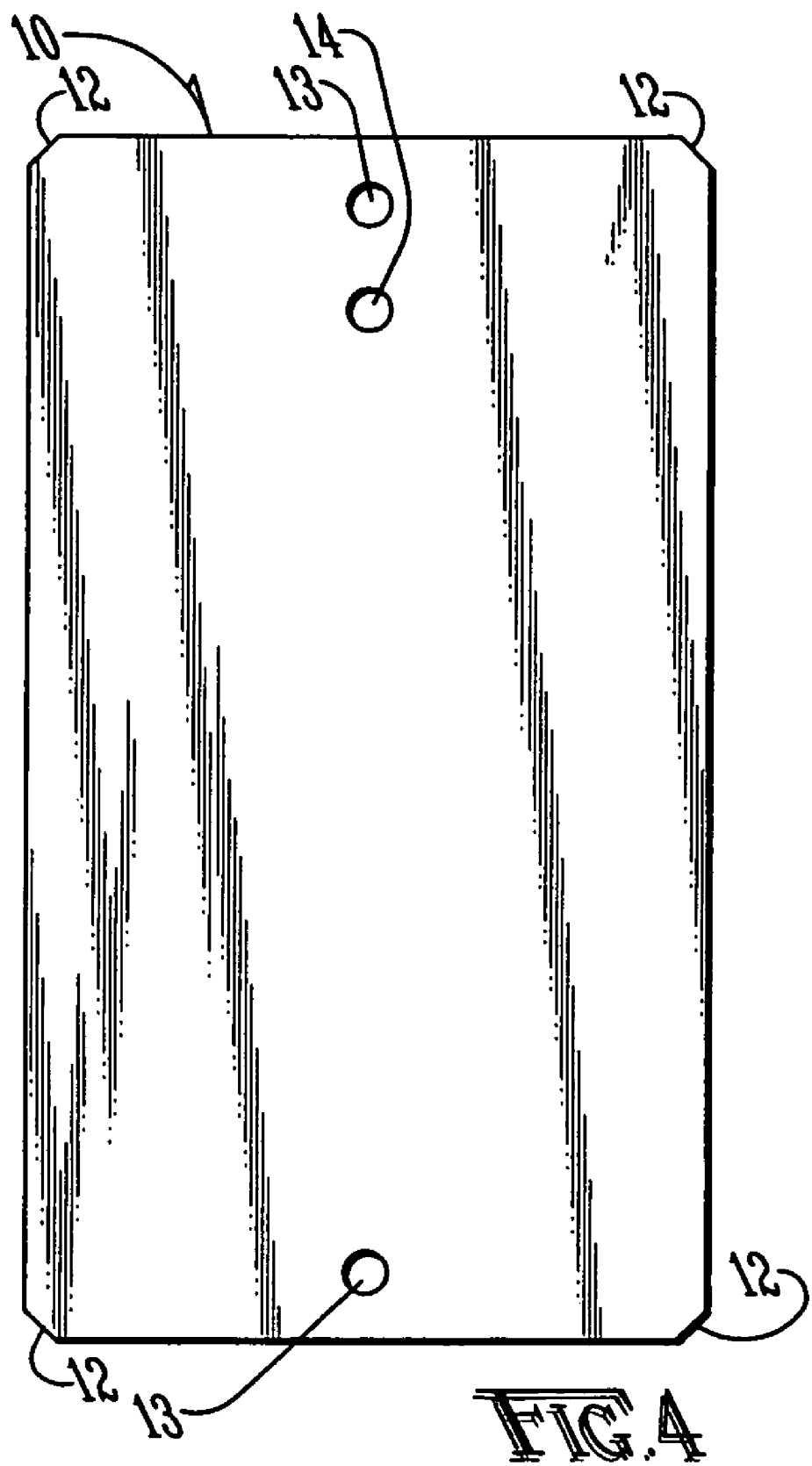
FIG. 4 is a front elevation view of the cover plate of FIG. 1.

The present invention is a temporary construction cover plate 10 as shown in FIGS. 1 and 4, having appropriate dimensions to be affixed to a single gang electrical box 20, multiple gang electrical box 30, 31, 32 or mud ring 33 (collectively referred to herein as electrical box 20, 30, 31, 32, 33). The cover plate 10 is affixed to the electrical box 20, 30, 31, 32, 33 using retaining clip 11 shown in FIGS. 2A, 2B and 8. The material of the cover plate 10 is such that normal operation of the rotary cutting tool will not easily penetrate the plate 10. It has been found that twenty-six gauge steel with a G90 galvanized finish is acceptable for the practice of the invention, but the invention is not limited to this material. Other materials, such as plastic or other material that may be suitable for injection molding, may be acceptable in a particular application. It is desirable that the cover plate 10 be constructed of steel so that the plate 10 may be detected magnetically after the plate 10 is hidden behind drywall. The cover plate 10 may have radiused or chamfered corners 12 to conform to the shape of electrical boxes which may also have radiused or chamfered corners. It is a significant feature of the present invention that the cover plate 10 is flat without upturned or downturned rims or similar features that would prevent the cover plate 10 from being overlapped to cover multiple gang electrical boxes as described hereinafter. As shown in drawing FIGS. 1 and 3-7, the cover plate 10 is flat without projections.

Figure 6A:
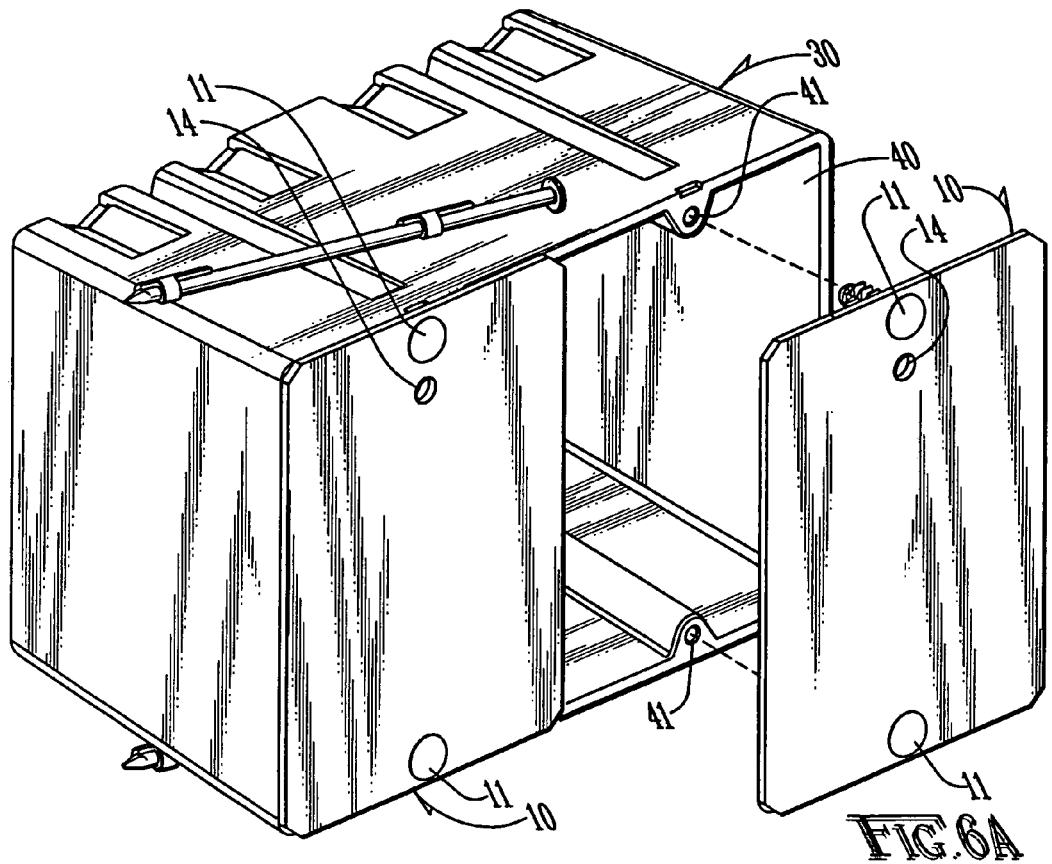
FIG. 6A is perspective view of a double gang electrical box covered by two single cover plates. One cover plate is shown in the attached position and the other cover plate is shown in an exploded view.
Figure 6B:
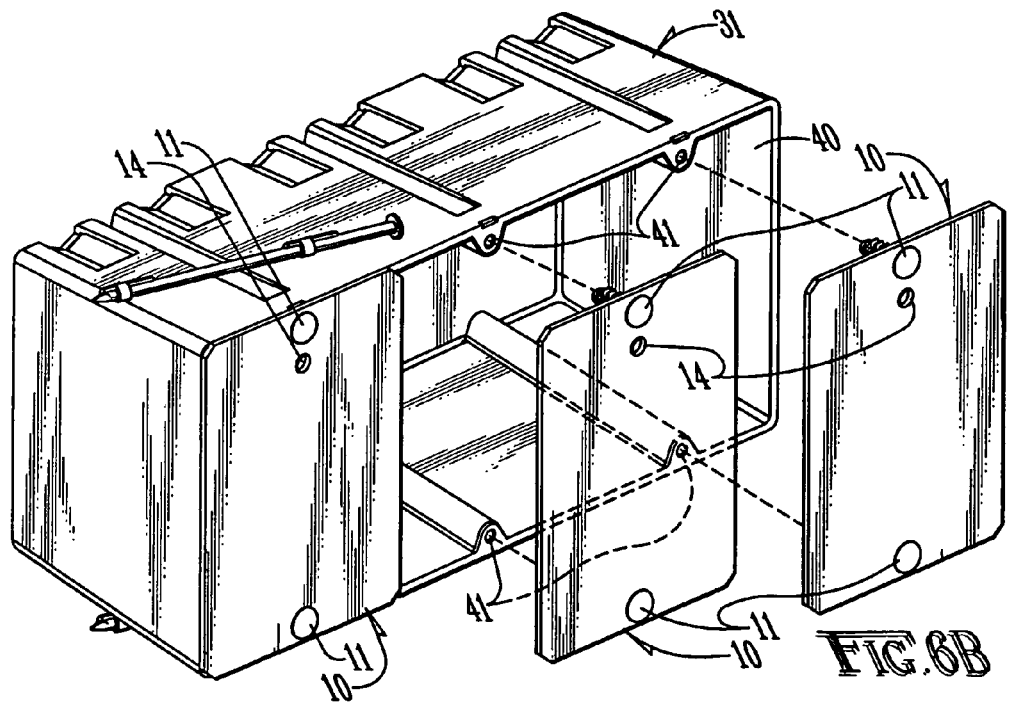
FIG. 6B is a perspective view of a triple gang electrical box covered by three single cover plates.

Electrical box 20, 30, 31, 32, 33 has an interior space with a front opening 40 as exemplified in FIGS. 6A and 6B. The outside dimensions of the cover plate 10 are such that the opening of the electrical box 20, 30, 31, 32, 33 is covered to protect the front opening 40 of the electrical box, the screw sockets 41, and the contents of the electrical box, as shown in FIGS. 3A and 3B. The covers should be substantially the same dimensions as the opening of the electrical box so that the contents are protected by the cover but a rotary cutting tool can cut closely around the outer periphery of the box. (The term "screw socket" as used herein is intended to encompass both threaded screw holes and tapered screw sockets where the screw is affixed by a self-tapping process.) Two symmetrical screw openings 13 aligned on a center line along the long axis of the plate 10 are positioned to align with the screw sockets 41 of the electrical box 20, 30, 31, 32, 33.

With respect to single gang electrical box as shown in FIGS. 3A and 3B, the cover plate 10 is secured to the electrical box 20 using snap-wise removable retaining clips 11. A removal opening 14 is located in the cover plate 10 as shown in FIG. 4 to allow easy removal of the cover plate 10. The removal opening 14 may be of various shapes and sizes, for example, the removal opening 14 may be round as shown in FIG. 3A or alternatively, a slotted removal opening 15 as shown in FIG. 3B may be provided. It is desirable that the removal opening 14, 15 be as small as possible to minimize the possibility of a tool, such as a rotary tool, inadvertently entering the removal opening 14, 15 and damaging the contents of the electrical box 20. The removal opening 14, 15 is desirably sized to allow a small tool, such as an awl or Phillips head screwdriver or even a nail, to be inserted into the opening 14, 15 to pry the cover 10 from the electrical box 20. It is desirable that the removal opening 14, 15 be located near one of the screw openings 13 and away from the center of the cover plate 10. If the removal opening 14, 15 is located near the center of the cover plate 10, then removing the cover plate 10 from the electrical box 20 against the resistance of both retaining clips 11 may be difficult. By locating the removal opening 14, 15 asymmetrically on the cover plate 10, that is, away from the center of the plate 10 and near one or the other of the screw openings 13, leverage is enhanced and the cover plate 10 may be pulled free from first one and then the other screw socket 41 of the electrical box 20.

Figure 2A:
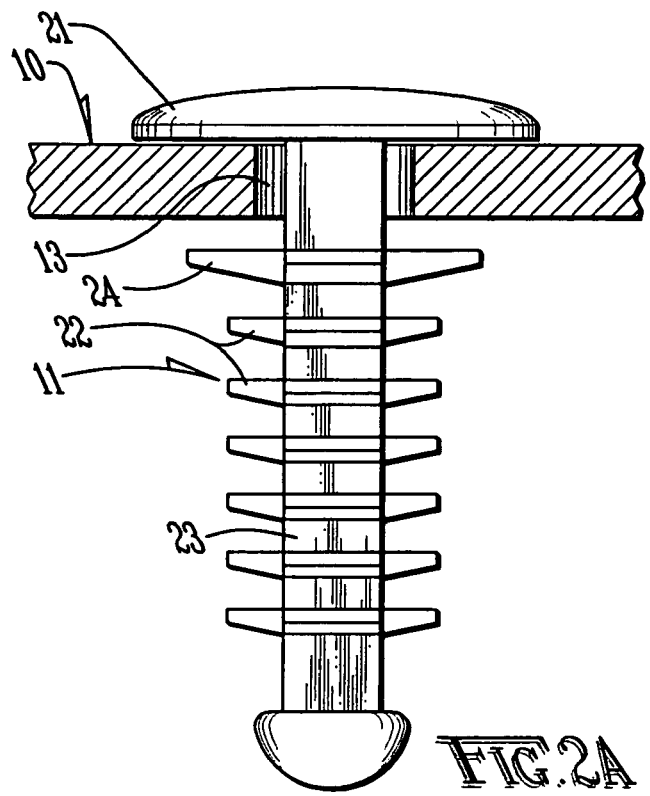
FIG. 2A is a front elevation view of a retaining clip of the present invention showing the retaining clip snap-wise disposed within a screw opening in a partial cross-section of a cover plate.
Figure 2B:
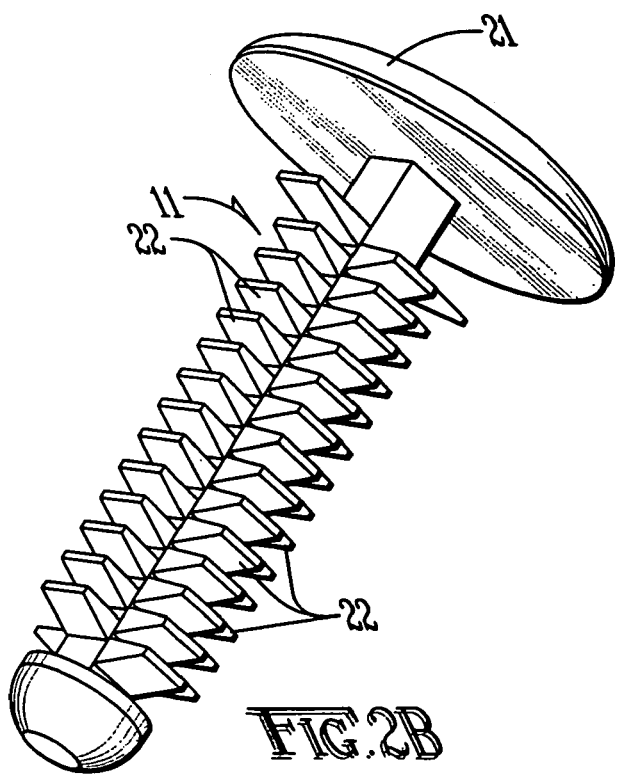
FIG. 2B is a perspective view of a retaining clip.

As shown in FIGS. 2A, 2B and 8, the retaining clip 11 is provided with a low profile head 21 to minimize the possibility of the head 21 being caught by a tool and pulled off. The retaining clip 11 has means for providing a friction fit on either threaded screw holes or tapered screw sockets 34. One such means is obtained by a plurality of flexible external ribs 22 on the shank 23 of the retaining clip 11. Fasteners having flexible external ribs capable of a friction fit on either threaded screw holes or tapered screw sockets are known in the prior art from products available from Micro Plastics, Inc., Flippin, Ark. Tapered screw sockets are commonly found on plastic electrical boxes 32 and allow screws to be self-tapping. As shown in FIG. 8, in order to provide the proper frictional retaining action on such tapered screw sockets 34, the retaining clip 11 must have a long enough shank 23 to reach to a sufficient depth into the screw socket 34 for the clip 11 to frictionally engage the walls of the screw socket 34. In order to allow the flexibility to use the retaining clip 11 in situations where a shorter length may be desirable, the retaining clip 11 is desirably made of plastic or similar material such that the shank 23 of the clip 11 can be cut off to a shorter length. A shorter length allows the retaining clip 11 to be more easily removed from a threaded screw hole which grips the retaining clip 11 more firmly due to the threads interacting with the exterior ribs 22 of the retaining clip 11. As shown in FIGS. 2A, 2B and 8, the retaining clip 11 is provided with at least one wide rib 24 spaced from the head 21 of the clip 11. Although two wide ribs 24 are shown in FIGS. 2A, 2B, and 8, the invention is not so limited and in particular situations, different numbers of wide ribs 24 may be desirable. For example, four wide ribs 24 will provide greater holding power. The wide rib 24 is sized to allow the clip 11 to be removably snapped into the screw opening 13 of the cover plate 10 where the wide rib 24 retains the clip 11 together with the cover plate 10 when the cover plate 10 is not in use. The other exterior ribs 22 are sized to allow them to pass more easily through the screw opening 13. The clip 11 may be removed from the cover plate 10 allowing the flexibility to use the cover plate 10 with screws rather than with the clip 11.

Figure 5:
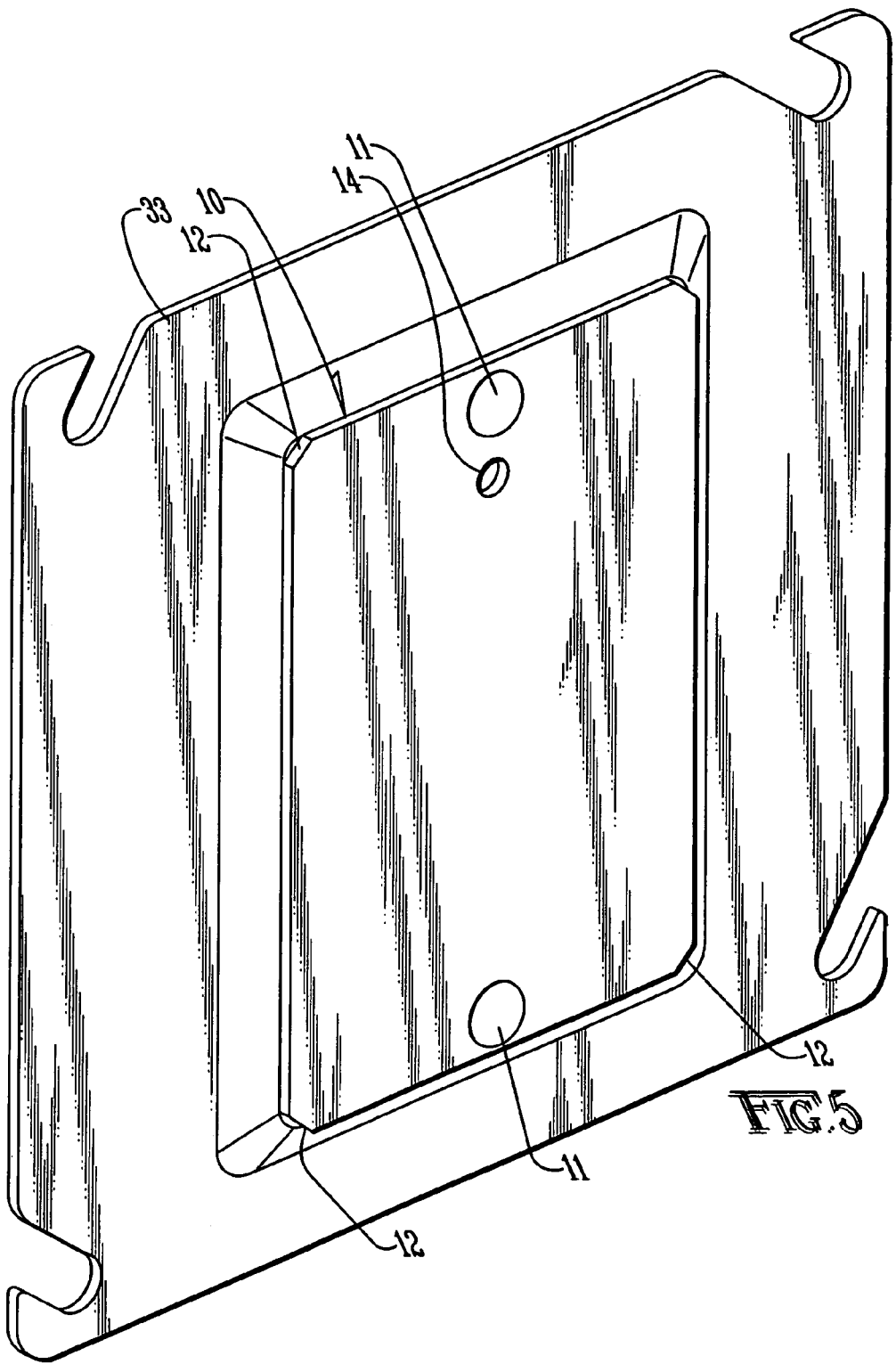
FIG. 5 is a perspective view of the cover plate attached to a mud ring.

A single gang cover plate 10 may be used for a single gang electrical outlet box 20 as shown in FIG. 3 or a single gang mud ring 33 as shown in FIG. 5. The single gang cover plate 10 may also be used to cover a double, triple, or other multiple gang electrical outlet box 30, 31 by affixing and overlapping multiple single gang cover plates 10 as shown in FIG. 6A and FIG. 6B. A one-piece cover plate 50 for multiple gang electrical outlet boxes 32 has the same vertical dimension as a single gang cover plate 10, but has a horizontal dimension and a hole pattern to adequately cover and protect the front opening and contents of the electrical outlet box 32 as shown in FIG. 7.

There are other types of electrical outlet boxes that are used in the construction industry such as a two-gang mud ring, and light electrical outlet boxes. A cover plate embodying the teachings of the present invention and having the appropriate dimension and hole pattern may be used for these purposes also.

Using a single gang cover plate 10 and electrical box 20 as examples, the cover plate 10 is used in the following manner. Once the electrician finishes the rough-in wiring, pre-cuts and strips the wire conductors, and rolls or folds the wire conductors into the electrical outlet box 20, the appropriate cover plate 10 and retaining clip 11 are used to affix the cover plate 10 to the electrical outlet box 20. The clips 11 are placed into and snapped through the symmetrical screw openings 13 in the cover plate 10 and are then aligned and pushed into a friction fit with the screw sockets 41 of the electrical outlet box 20 so that the cover plate 10 covers the front opening of the electrical outlet box 20 and the screw sockets 41. This is done prior to the other subcontractors starting their respective phases of the construction project. At this point the electrical outlet box 20 and the contents of the electrical outlet box 20 are protected from the damage that can occur from the other subcontractors on the job site. Once all of the other subcontractors have finished their phases, the electrician can come back and easily remove the cover plate 20 via the removal opening 14 in the cover plate 10. The electrical outlet box 20, screw sockets 41 and the contents of the electrical outlet box 20 will be in undamaged condition.

The present invention has been described with reference to certain preferred and alternative embodiments that are intended to be exemplary only and not limiting to the full scope of the present invention as set forth in the appended claims.

What is claimed is:

1. A kit for use during construction for temporarily protecting an electrical box having a front opening into an interior space and at least two screw sockets for receiving screws, comprising:

at least one cover plate, said cover plate being flat without projections and dimensioned to substantially cover the front opening of the interior space of the electrical box and said flat plate having substantially the same dimensions as the opening of the electrical box, said cover plate having at least two screw openings aligned along a center line of a long axis of said plate and capable of alignment with respective screw sockets, and said cover plate having a removal opening; said removal opening positioned such that said removal opening is not aligned with a screw socket when said screw openings are aligned with respective screw sockets, wherein said removal opening is dimensioned to a minimum size sufficient to closely receive a blade end of a screwdriver; and at least one retaining clip having means for snap-wise removable attachment in at least one of said at least two screw openings; said retaining clip having a head, a shank, and means on said shank for removably securing said retaining clip by a friction fit in at least one of the respective screw sockets;

wherein said means for removably securing said retaining clip in said at least one of the respective screw sockets comprises a plurality of external flexible ribs on said shank, and said means for snap-wise removable attachment in said at least one of said at least two screw openings comprises at least one wide flexible rib wider than said external flexible ribs and spaced from said head of said clip.

2. The kit of claim 1 wherein said removal opening is located asymmetrically on said cover plate.

3. The kit of claim 1 wherein said removal opening is round.

4. The kit of claim 1 wherein said removal opening is a slot.

* * * * *

UNITED STATES PATENT AND TRADEMARK OFFICE
CERTIFICATE OF CORRECTION

PATENT NO. : 8,261,926 B2  Page 1 of 1
APPLICATION NO. : 10/437122
DATED : September 11, 2012
INVENTOR(S) : Frank H. Bradley and Wade R. Bradley It is certified that error appears in the above-identified patent and that said Letters Patent is hereby corrected as shown below:

In the Title, delete "Temporally" and substitute therefore --Temporarily--.

Signed and Sealed this
Thirteenth Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,261,926 B2  Page 1 of 1
APPLICATION NO. : 10/437122
DATED : September 11, 2012
INVENTOR(S) : Frank H. Bradley and Wade R. Bradley It is certified that error appears in the above-identified patent and that said Letters Patent is hereby corrected as shown below:

Title Page, Item (54) and at Column 1, line 1, in the Title, delete "Temporally" and substitute therefore --Temporarily--.

This certificate supersedes the Certificate of Correction issued November 13, 2012.

Signed and Sealed this
Eleventh Day of December, 2012

David J. Kappos
*Director of the United States Patent and Trademark Office*